United States Patent [19]
Henzler et al.

[11] Patent Number: 5,311,789
[45] Date of Patent: May 17, 1994

[54] MOTOR VEHICLE TRANSMISSION HAVING GEARINGS FOR SIX FORWARD SPEEDS AND ONE REVERSE SPEED

[75] Inventors: Helga Henzler, Murr; Guenter Knoedel, Muehlacker; Monika Rack, Markgroeningen, all of Fed. Rep. of Germany

[73] Assignee: Getrag Getriebe-Und Zahnradfabrik H.H. GmbH, Ludwigsburg, Fed. Rep. of Germany

[21] Appl. No.: 972,376

[22] Filed: Nov. 5, 1992

[30] Foreign Application Priority Data
Nov. 6, 1991 [DE] Fed. Rep. of Germany ....... 4136455

[51] Int. Cl.$^5$ ...................... F16H 3/093; B60K 17/08
[52] U.S. Cl. ......................................... 74/331; 74/359
[58] Field of Search ........................... 74/330, 331, 359

[56] References Cited
U.S. PATENT DOCUMENTS
4,738,149 4/1988 Janiszewski ..................... 74/331 X

FOREIGN PATENT DOCUMENTS
0046373 2/1982 European Pat. Off. .
0083747 7/1983 European Pat. Off. .
4116189 11/1991 Fed. Rep. of Germany ........ 74/331

Primary Examiner—Leslie A. Braun
Assistant Examiner—Khoi Ta
Attorney, Agent, or Firm—Kokjer, Kircher, Bowman & Johnson

[57] ABSTRACT

A transmission has a drive shaft, at least two countershafts, and an output shaft. A set of gearwheels is arranged on the drive shaft, the gearwheels meshing pairwise with corresponding gearwheels on the countershafts. Gearshift sleeves provide non-rotatable interlocking of one gear wheel each of the pairs to the respective shaft on which it is provided, while the respective other gearwheel of the pair is non-rotatable interlocked to the shaft on which it is provided. Further, the countershafts each have a gearwheel meshing with a corresponding gearwheel on the output shaft. Each two gearwheels on the input shaft simultaneously mesh with one gearwheel on the first countershaft and mesh with one gearwheel on the second countershaft.

2 Claims, 8 Drawing Sheets

MOTOR VEHICLE TRANSMISSION HAVING GEARINGS FOR SIX FORWARD SPEEDS AND ONE REVERSE SPEED

BACKGROUND OF THE INVENTION

1. Field of the Invention

The invention relates to the motor vehicle transmission having gearings for six forward speeds and one reverse speed as are commonly known from modern passenger motor vehicles having advanced stickshift transmission technology incorporated therein.

More particularly, the invention relates to such a transmission with an input or drive shaft with at least one first and one second countershaft, and with an output shaft; the shafts being arranged parallel to one another but only in pairs in each case in a common plane, and gearwheels arranged on the input shaft meshing, in each case in pairs, with gearwheels of the first and second countershaft, respectively. Furthermore, shift bushings or gearshift sleeves for non-rotatably locking one gearwheel of each pair of the respective shaft that carries it are provided, while the respective other gear wheel is non-rotatably locked to the shaft which carries it; also the first and second countershaft each have a gearwheel that meshes with a gearwheel arranged on the output shaft; and lastly two of the pairs comprising a common gearwheel on the input shaft.

2. Description of the Related Art

A transmission of the aforesaid type is known from EP-PS 224 407.

Reduction transmissions of conventional design as usually utilized for motor vehicles with a standard drive configuration—i.e. with an engine arranged at the front, perpendicular to the direction of travel—in most cases use an input shaft on whose coaxial extension the output shaft is located. Located parallel to this input/output shaft is an intermediate shaft or countershaft, and between these two shaft arrangements mesh as many gearwheel pairs as there are gears provided by the transmission. For reverse gear, it is then usual to utilize another idler or reversing gearwheel that is mounted on a further countershaft so as to rotate freely.

However, this conventional reduction transmission design leads to very long transmissions if the transmission is to be provided with a plurality of gears.

On the other hand, the trend in modern automotive design is towards reduction transmissions with increasing numbers of gears, since with greater numbers of gears it is easier to utilize the optimum and therefore most economical speed range of the engine.

A further trend in modern automotive design, moreover, is that of arranging the engine and transmission, as a design unit, perpendicular to the long axis of the vehicle in the engine compartment.

There thus exist in transmission design two conflicting demands, namely on the one hand to provide as many gears as possible in the transmission, but on the other hand to make the axial length as short as possible.

In this context numerous transmissions are known in which not just one, but two or more countershafts are provided, so that the various gearwheel pairs can be arranged in a space-saving manner. In a sectioned depiction in which the various shafts are sectioned radially, the shafts in this instance lie at the vertices of an irregular polygon. This means that in each case only two of the shafts (which of course run parallel to each other) define a common plane, while all the other shafts lie outside this plane.

In the six-speed reduction transmission known from the aforesaid EP-PS 224 407, a total of five mutually parallel shafts are provided, namely an input shaft with a total of six fixed gearwheels, a first countershaft with three freewheeling gearwheels and one fixed gearwheel, a second countershaft with three freewheeling gearwheels and two fixed gearwheels, a third countershaft that carries only one reversing gearwheel for reverse gear, and lastly an output shaft with a freewheeling gearwheel that is connected via a differential to the output shaft. This known six-speed transmission thus comprises a total of seventeen gearwheels on a total of five shafts. The axial length of this transmission is determined by the shaft with the most gearwheels, i.e. in this case by the input shaft with the six fixed gearwheels.

In the known transmission, separate gearwheel pairs are each provided for first, second, third, sixth, and reverse gears, each consisting of a fixed gearwheel on the input shaft and a freewheeling gearwheel on the first or second countershaft. Only in the case of reverse gear is the reversing gearwheel on the third countershaft shifted into place between the fixed gearwheel on the input shaft and the fixed gearwheel on the second countershaft. Common output from the countershafts to the output shaft occurs via the two fixed gearwheels on the countershafts, which simultaneously mesh with the differential gearwheel on the output shaft. Only for fourth and fifth gears is there an arrangement in which a fixed gearwheel on the input shaft meshes with a freewheeling gearwheel on the first countershaft and simultaneously with a freewheeling gearwheel on the second countershaft. Either fourth or fifth gear can therefore be engaged by selectively non-rotatably locking one of these freewheeling gearwheels to the respective countershaft that carries it.

However, for the reasons already mentioned the axial length is extremely great, especially because of the total of six gearwheels required on the input shaft, and the additional gearwheel plane required for output.

EP-OS 207 910 discloses a transmission of similar configuration, but designed only as a five-speed transmission. In this case a separate gearwheel pair is provided for each individual gear, i.e. for the five forward gears and for reverse. With one input shaft, two countershafts, and one output shaft, this creates a need for a total of fifteen gearwheels, of which a total of six are arranged next to one another on the input shaft, so that here again, with respect to the gearwheel planes required for output, the resulting axial length is just as great as with the aforementioned transmission according to EP-OS 224 407, although the transmission according to EP-OS 207 910 is designed for one less gear.

EP-PS 239 553 discloses a further five-speed reduction transmission. This known transmission has only two countershafts, since reverse gear is implemented by directing power via two intermeshing freewheeling gearwheels on the countershafts, one of which has a second gear rim for first gear and operates as a freewheeling gearwheel when reverse gear is engaged, while the other gearwheel on the other countershaft is non-rotatably locked to that same countershaft when reverse gear is engaged.

But even this known transmission, with five forward gears, has a considerable length, since five gearwheels are still located on the input shaft. Thus there is only a slight reduction in axial length with respect to the output gearwheel plane, as compared to the transmissions explained earlier. In addition, this known reduction transmission still requires fourteen gearwheels for five speeds.

SUMMARY OF THE INVENTION

The underlying object of the invention is therefore to develop a six-speed reduction transmission of the aforesaid type in such a way as to reduce the axial length and the number of gearwheels required.

This object is achieved, according to the invention, by the fact that each two gearwheels on the input shaft mesh simultaneously with one gearwheel on the first countershaft and a further gearwheel on the second countershaft.

The underlying object of the invention is completely achieved in this manner. Specifically, with the transmission according to the invention even more gearwheel pairs are placed in a common gearwheel plane, thus reducing not only the axial length but also the number of gearwheels required. For example it is possible, with embodiments of the invention that will be explained later on, to reduce the total number of gearwheels to sixteen or even fourteen, with the maximum number of gearwheels on a shaft reduced to a total of five. In practice, it is possible in this manner to design a six-speed reduction transmission that, with a transferred torque in the range between 370 and 400 Nm, six forward speeds, and a synchronized reverse gear, has a length of only 330 mm. These figures cannot be attained under any circumstances with the conventional reduction transmissions of the types explained earlier, especially not the aforesaid axial length and elimination of one or more gearwheels. It should be noted in this context that in modern automotive engineering, even the slightest reduction in dimensions, weights, and parts count can lead to very considerable advantages, for example if—as in this case—only a novel transmission concept makes it at all possible to install the transmission together with the engine perpendicular to the direction of travel, given a certain maximum vehicle width.

In a first embodiment of the invention, a further gearwheel on the input shaft meshes with a gearwheel on the first countershaft, and the latter in turn with a gearwheel on the second countershaft, each gearwheel on the countershafts being non-rotatably lockable by means of shift bushings to the countershaft that carries it, and the gearwheel on the first countershaft being simultaneously located in the power flow for both reverse gear and a forward gear.

The advantage of this feature is that a reduction of three gearwheels and one countershaft is possible compared with the aforesaid generic reduction transmission, since not only several forward gears, but also the reverse gear, are integrated into common gearwheel planes; and one of the gearwheels of the first countershaft serves simultaneously as a working gearwheel of a forward gear and as a reversing gearwheel (freewheeling gearwheel) in reverse gear, without requiring different gear teeth for the purpose, as is the case in another context with the aforementioned transmission according to European Patent 239 553.

In a further embodiment of a transmission according to the invention, a further gearwheel on the input shaft meshes with a gearwheel free to rotate on a third countershaft, and this in turn with a gearwheel on the first countershaft, the gearwheel on the first countershaft being non-rotatably lockable to the first countershaft by means of a shift bushing.

The advantage of these features is that the gears can be favorably arranged in the gearwheel pairs, allowing smaller intervals between gears.

In a further preferred embodiment of the invention, the gearwheel of the first countershaft that meshes with the output shaft has a different number of teeth than the gearwheel of the second countershaft that meshes with the output shaft.

The advantage of this feature is that different front axle ratios are possible.

Further advantages of the invention are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE INVENTION

Exemplary embodiments of the invention are depicted in the drawings and are described further in the description below. In the drawings.

DETAILED DESCRIPTION OF THE INVENTION

Figure 1:
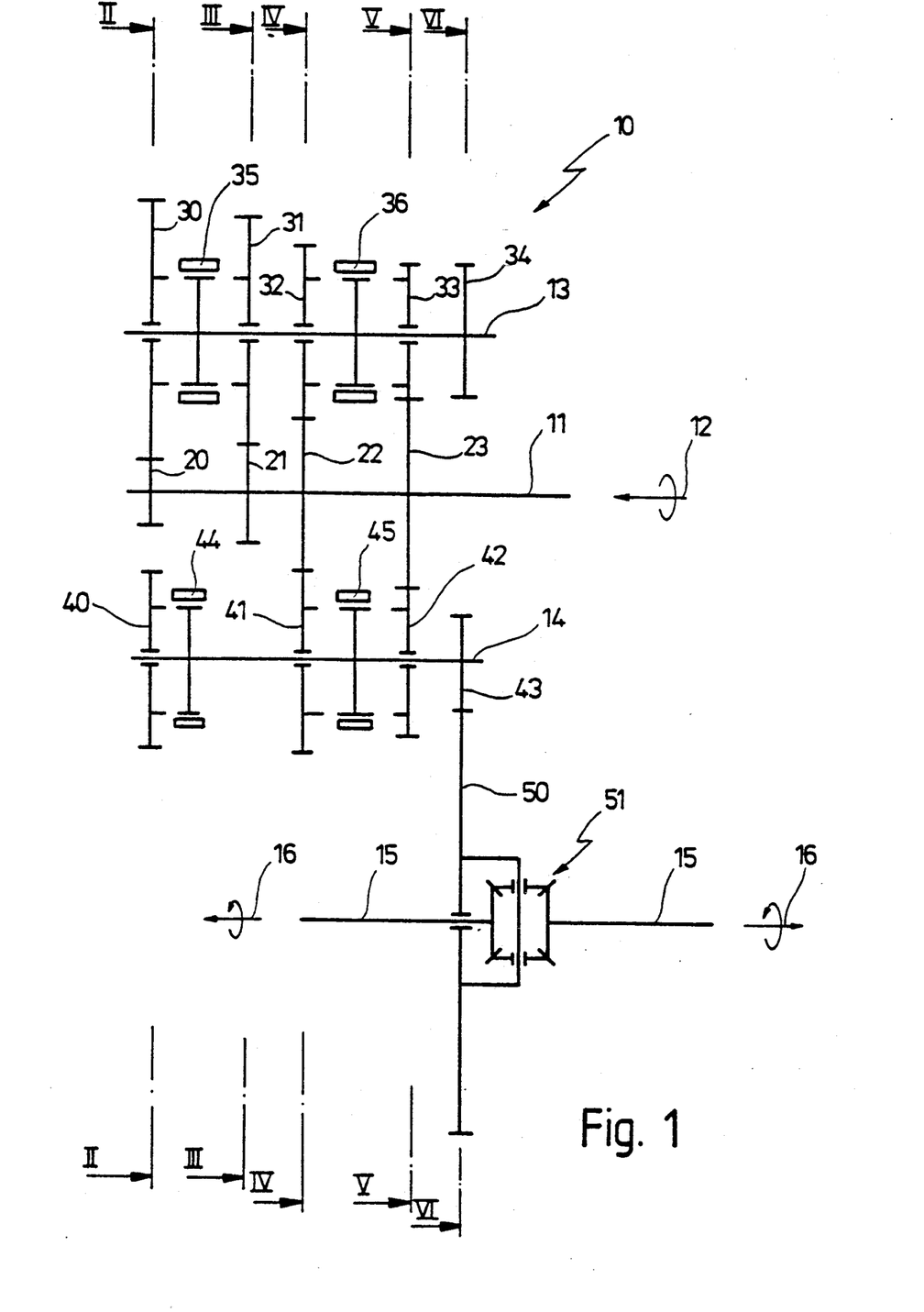
FIG. 1 shows a highly schematic developed side view of a first exemplary embodiment of a six-speed reduction transmission according to the invention.

In FIG. 1, 10 designates the entirety of a six-speed reduction transmission as preferably intended for use in a motor vehicle.

The transmission 10 has an input shaft 11 to which drive energy is conveyed, via a clutch (not depicted) from an engine (also not depicted), as indicated by an arrow 12.

Arranged parallel to the input shaft 11 are a first countershaft 13 and a second countershaft 14. Output shafts 15 also extend parallel to the said shafts 11, 13, and 14. Output energy is taken off at the output shafts 15 by the driven wheels of the motor vehicle, as indicated by arrows 16.

The input shaft 11 is provided with four gearwheels 20, 21, 22, 23 configured as fixed gearwheels, with different numbers of teeth and diameters.

A total of four gearwheels 30, 31, 32, 33 configured as freewheeling gearwheels are mounted on the first countershaft 13, while one gearwheel 34 configured as a fixed gearwheel is fastened thereon.

By means of shift bushings 35 and 36, the gearwheels 30, 31, 32, 33 can be selectively locked non-rotatably, in the conventional manner, to the first countershaft 13.

It is understood here that the term "shift bushing" is to be understood simply as an example, since of course any arrangement with which a freewheeling gearwheel can be locked non-rotatably to the shaft that carries it can be used in the context of the present invention.

Gearwheels 40, 41, and 42 configured as freewheeling gearwheels are mounted on the second countershaft 14, while a gearwheel 43 configured as a fixed gearwheel is fastened thereon.

Here again, shift bushings 44 and 45 are provided to allow the gearwheels 40, 41, and 42 each to be individually and selectively locked non-rotatably to the second countershaft 14.

A gearwheel 50 that is connected by means of a conventional differential 51 to the output shafts 15 runs on output shafts 15.

The depiction in FIG. 1 is a "developed" depiction, in which the various gearwheel meshings cannot all be depicted, since the shafts 11, 13, 14, and 15 do not lie in a common plane.

Figure 2:
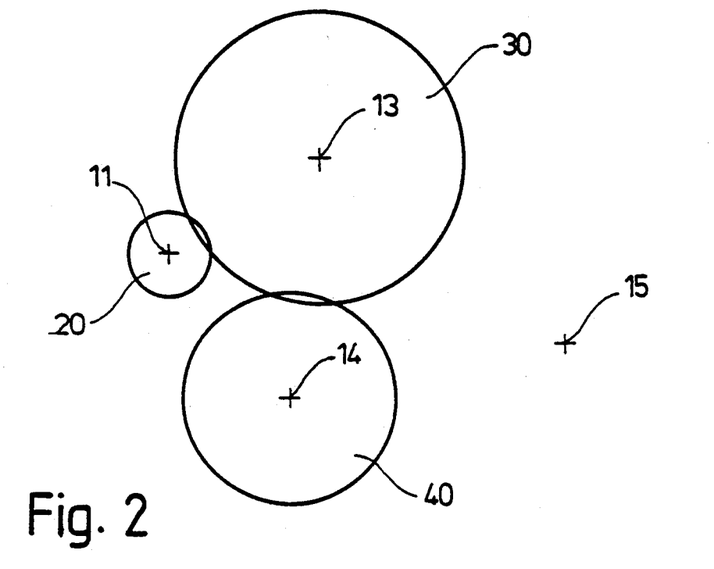
FIGS. 2 to 6 show sectioned depictions along lines II—II to VI—VI of FIG. 1.

Instead, the arrangement is such that contrary to the developed depiction of FIG. 1, gearwheels 30 and 40, as well as gearwheels 34 and 50, mesh with one another. This will be explained below with reference to the sectioned depictions of FIGS. 2 to 6:

FIG. 2 shows that the fixed gearwheel 20 on the input shaft 11 meshes with the freewheeling gearwheel 30 on the first countershaft 13, and the latter in turn with the freewheeling gearwheel 40 on the second countershaft 14. The output shafts 15 are unoccupied in this plane.

Figure 3:
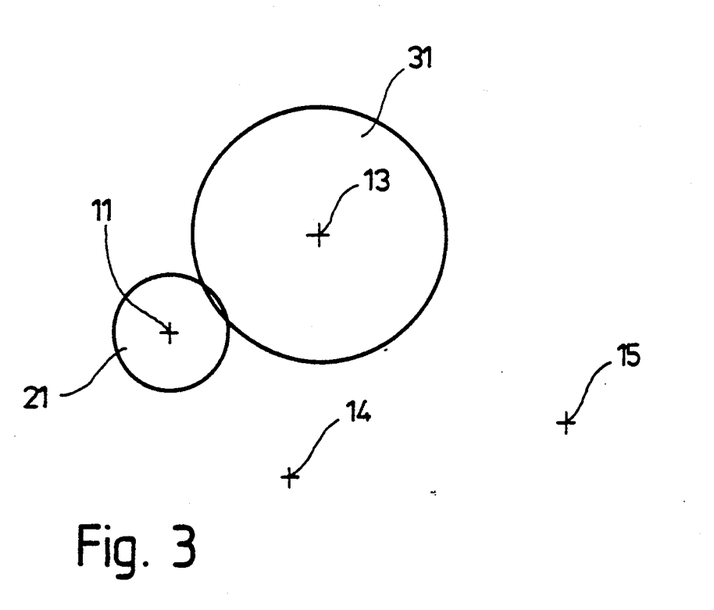

FIG. 3 shows correspondingly that the fixed gearwheel 21 on the input shaft 11 meshes with the freewheeling gearwheel 31 on the first countershaft 13.

Figure 4:
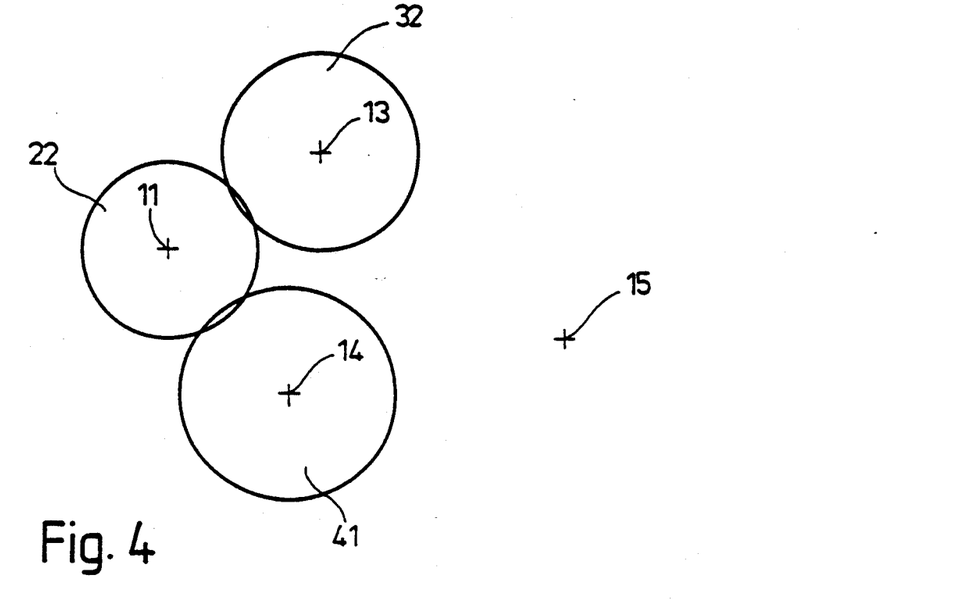

FIG. 4 shows correspondingly that the fixed gearwheel 22 on the input shaft 11 meshes both with the freewheeling gearwheel 32 on the first countershaft 13 and with the freewheeling gearwheel 41 on the second countershaft 14.

Figure 5:
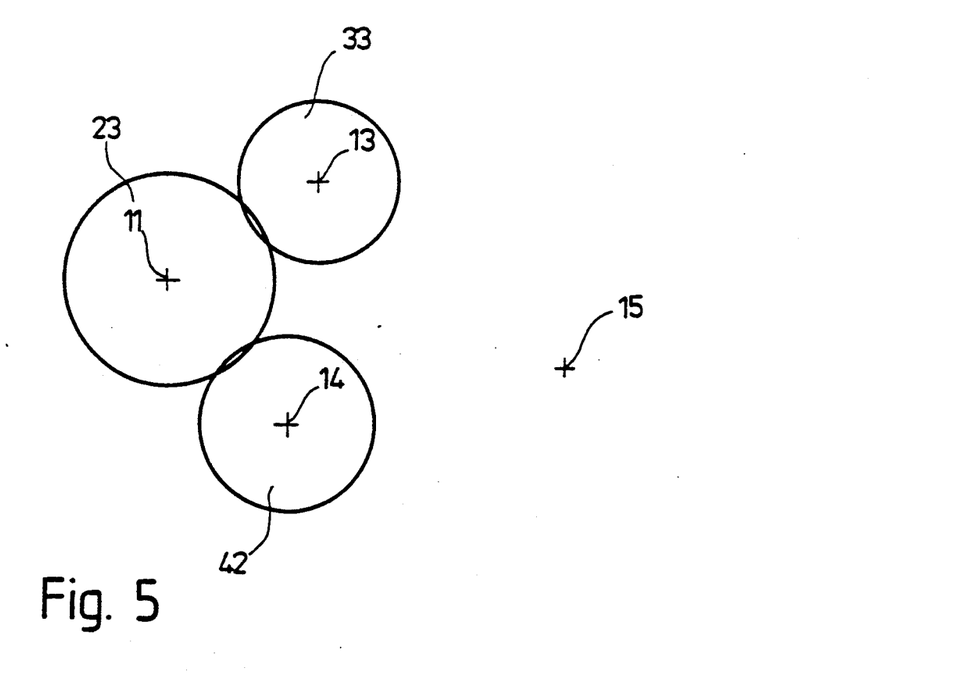

A further gearwheel set of this kind is depicted in FIG. 5, where it is evident that the fixed gearwheel 23 on the input shaft 11 meshes with the freewheeling gearwheel 33 on the first countershaft 13 and also with the freewheeling gearwheel 42 on the second countershaft 14.

Figure 6:
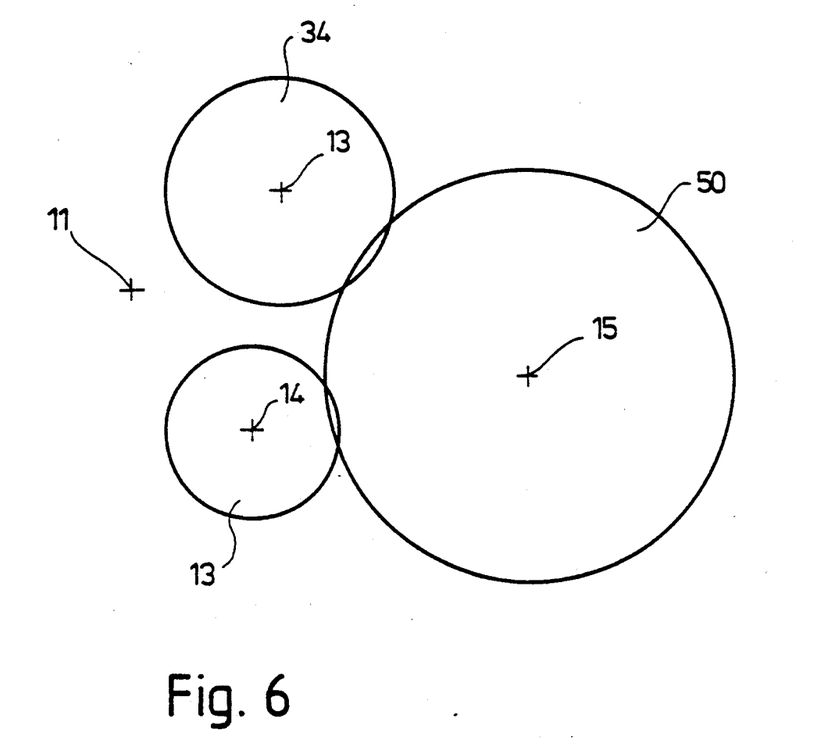

Lastly, FIG. 6 shows that the fixed gearwheels 34 and 43 on the countershafts 13 and 14, respectively, both mesh with the gearwheel 50 on the output shafts 15. The input shaft 11 is not occupied in this plane. It is clearly evident from FIG. 6 that the fixed gearwheels 34 and 43 have different diameters, so that they are also equipped with different numbers of teeth. This makes it possible to assign different basic ratios, with reference to the output shaft 15, to the two countershafts 13, 14.

The arrangement of gearwheels presented above results in the following power flows in the individual gears:

In first gear, the shift bushing 35 is moved to the left. Power flows via the input shaft 11, fixed gearwheel 20, gearwheel 30, the first countershaft 13, fixed gearwheel 34, and gearwheel 50, through the differential 51 to the output shafts 15.

In second gear, the shift bushing 35 is in the right-hand position, and power flows similarly via the input shaft 11, gearwheels 21 and 31, the first countershaft 13, and gearwheels 34 and 50 to the output shafts 15.

In third gear the shift bushing 45 is moved to the left, and power now flows via the input shaft 11, gearwheels 22 and 41, the second countershaft 14, and gearwheels 43 and 50 to the output shafts 15.

In fourth gear the shift bushing 45 is moved to the right, and power now flows via the input shaft 11, gearwheels 23 and 42, the second countershaft 14, and gearwheels 43 and 50 to the output shafts 15.

In fifth gear the shift bushing 36 is moved to the left, and power flows via the input shaft, gearwheels 22 and 32, the first countershaft 13, and gearwheels 34 and 50 to the output shafts 15.

In sixth gear, on the other hand, the shift bushing 36 is moved to the right, and power flows via the input shaft 11, gearwheels 23 and 33, the first countershaft 13, and gearwheels 34 and 50 to output shafts 15.

In reverse gear, shift bushing 35 is released and the shift bushing 44 is moved to the left. Power now flows via the input shaft 11 and the gearwheel 20 to the first-gear gearwheel 30—now co-rotating as a freewheeling gearwheel or reversing gearwheel—and gearwheel 40, to the second countershaft 14, and from there through gearwheels 43 and 50 to the output shafts 15.

Thus, as is evident from the depiction of FIG. 1, in this exemplary embodiment of a six-speed reduction transmission only four gearwheels each are needed on the input shaft 11 and the second countershaft 14, and five gearwheels on the first countershaft 13, or a total of only fourteen gearwheels including the output idler gearwheel 50.

Figure 7:
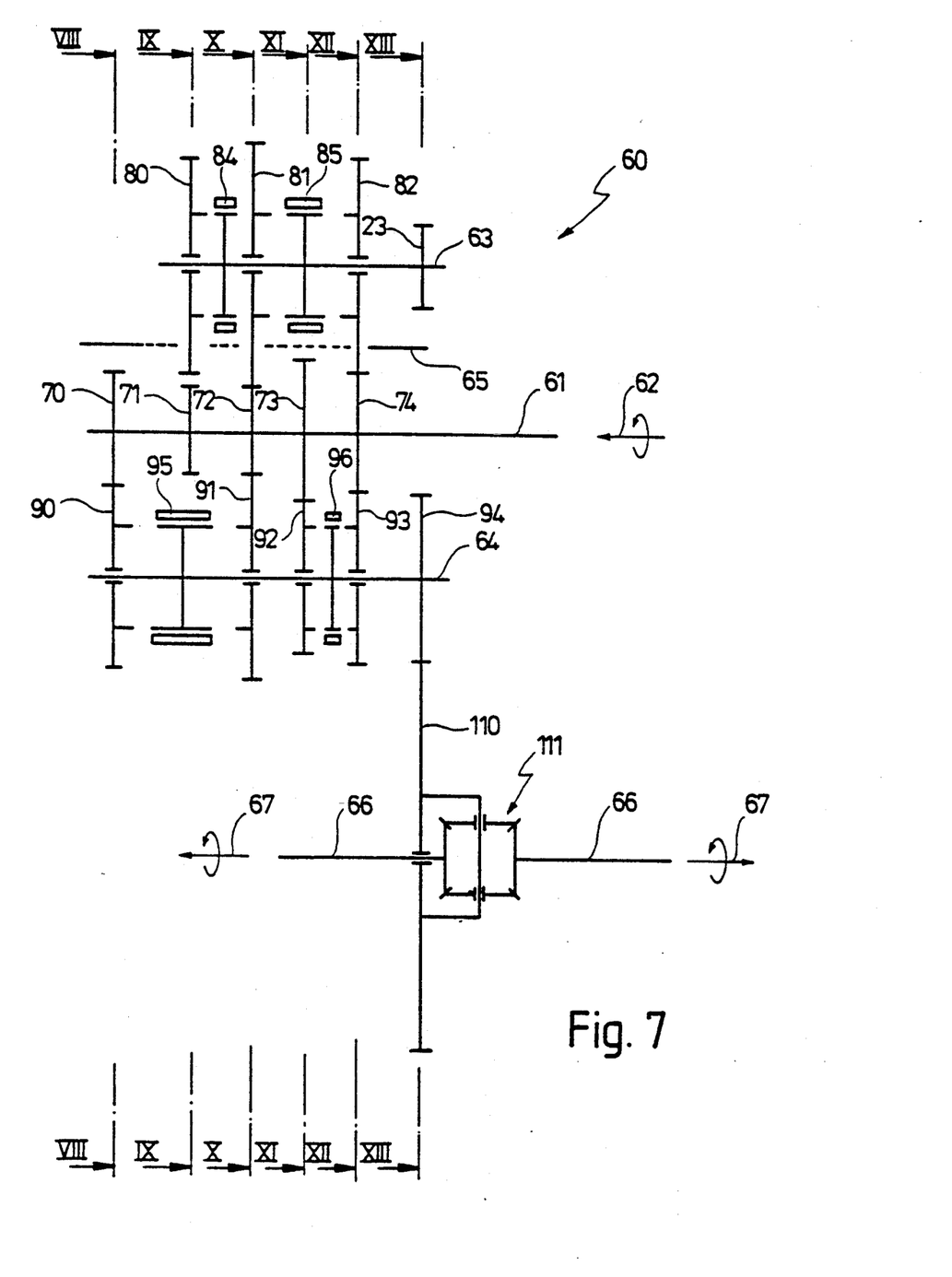
FIG. 7 shows a highly schematic developed side view of a second exemplary embodiment of a six-speed reduction transmission according to the invention.

A further exemplary embodiment of the invention is depicted in FIG. 7 in a depiction analogous to FIG. 1, and in FIGS. 8 to 13 in depictions analogous to FIGS. 2 to 6. To the extent possible, identical elements are assigned reference numbers that have simply been increased by 50 compared with the reference numbers of FIGS. 1 to 6.

In this exemplary embodiment of a six-speed reduction transmission, once again an input shaft 61 and two countershafts 63 and 64 are provided, but a further countershaft 65 is additionally present. Arranged in the output region is an output shaft 66 that corresponds entirely to the arrangement according to the first-mentioned exemplary embodiment.

In this instance the input shaft 61 carries five gearwheels 70, 71, 72, 73, and 74, arranged as fixed gearwheels. The first countershaft 63 carries three gearwheels 80, 81, and 82 arranged as freewheeling gearwheels, and one gearwheel 83 arranged as a fixed gearwheel.

The second countershaft 64 carries four gearwheels 90, 91, 92, and 93 arranged as freewheeling gearwheels, and one gearwheel 94 arranged as a fixed gearwheel.

Figure 9:
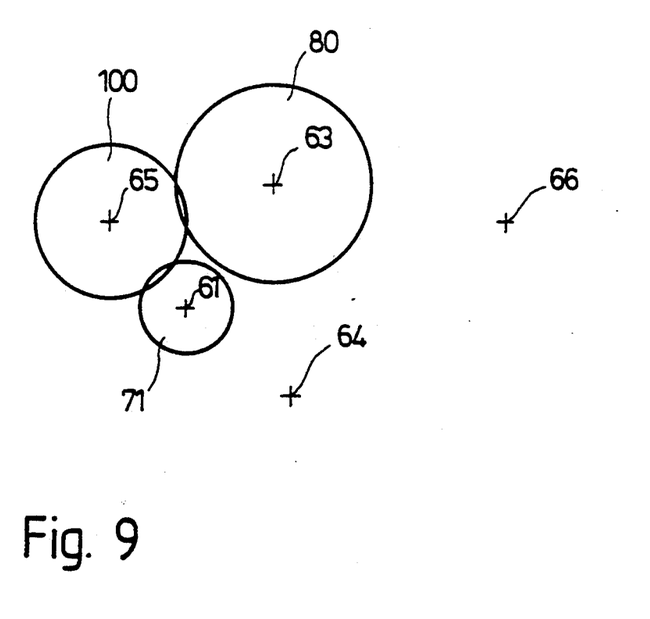

The third countershaft 65 carries a freewheeling gearwheel 100, acting as a reversing gearwheel and depicted only in FIG. 9.

Once again, shift bushings 84, 85, 95, and 96 of conventional design provide non-rotatable locking of the gearwheels 80, 81, 82, 90, 91, 92, and 93, which are arranged as freewheeling gearwheels.

Figure 8:
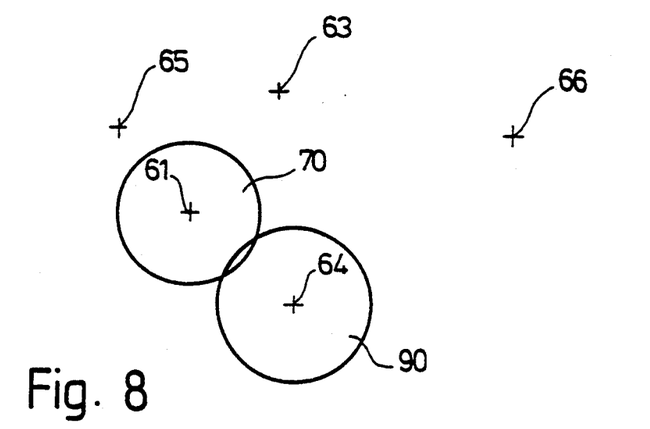
FIGS. 8 to 13 show sectioned depictions along lines VIII—VIII to XIII—XIII of FIG. 7.

Referring now, alongside the developed depiction of FIG. 7, to the associated sectioned depictions of FIGS. 8 to 13, the following gearwheel sets are evident:

According to FIG. 8, the fixed gearwheel 70 of the input shaft 61 meshes with the freewheeling gearwheel 90 on the second countershaft 64.

According to FIG. 9, the fixed gearwheel 71 on the input shaft 61 meshes via the reversing gearwheel 100 on the third countershaft 65 with the freewheeling gearwheel 80 on the first countershaft 63.

Figure 10:
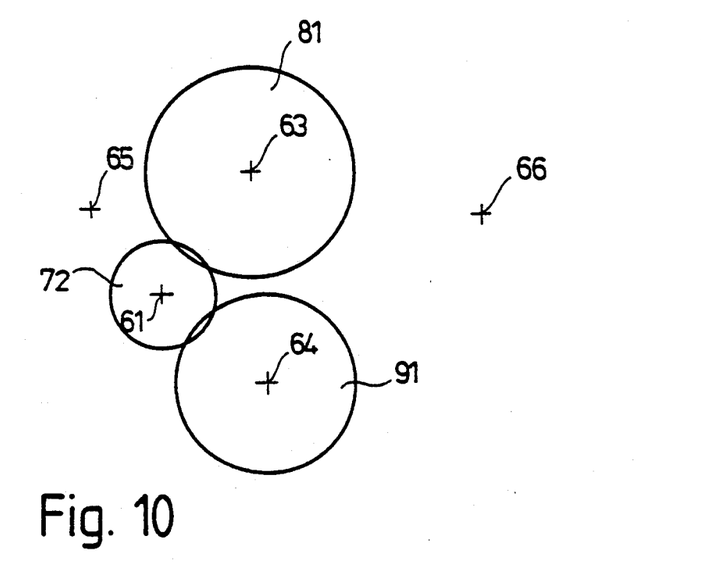

According to FIG. 10, the fixed gearwheel 72 on the input shaft 61 meshes both with the freewheeling gearwheel 81 on the first countershaft 63 and with the freewheeling gearwheel 91 on the second countershaft 64.

Figure 11:
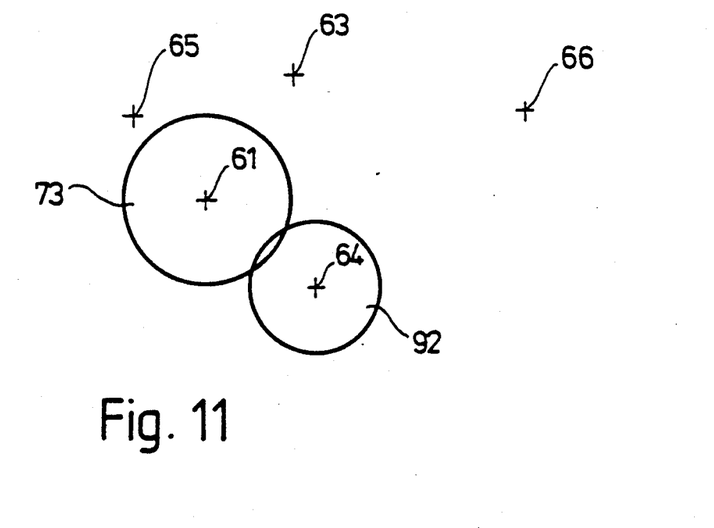

According to FIG. 11, the fixed gearwheel 73 on the input shaft 61 meshes with the freewheeling gearwheel 92 on the second countershaft 64.

Figure 12:
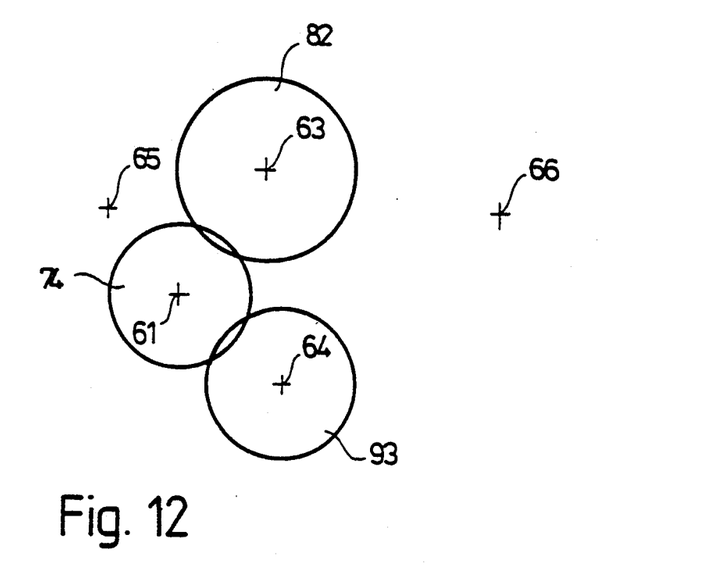

According to FIG. 12, the fixed gearwheel 74 on the input shaft 61 meshes both with the freewheeling gearwheel 82 on the first countershaft 63 and with the freewheeling gearwheel 93 on the second countershaft 64.

Figure 13:
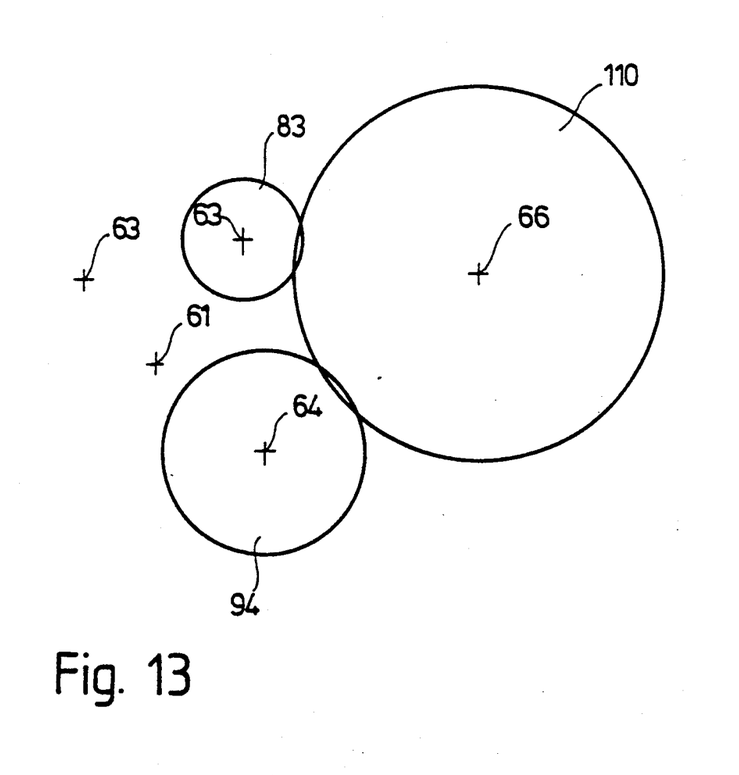

According to FIG. 13, the two fixed gearwheels 83 and 94 on the first countershaft 63 and the second countershaft 64, respectively, in turn mesh with the gearwheel 110 on the output shaft 66.

The power flows that result in the various gears, depicted by analogy with the first exemplary embodiment presented above, are thus as follows:

In first gear, power flows through elements 61, 72, 81, 63, 83, 110, and 66.

In second gear, power flows through elements 61, 74, 82, 63, 83, 110, and 66.

In third gear, power flows through elements 61, 72, 91, 64, 94, 110, and 66.

In fourth gear, power flows through elements 61, 70, 90, 64, 94, 110, and 66.

In fifth gear, power flows through elements 61, 74, 93, 64, 94, and 110.

In sixth gear, power flows through elements 61, 73, 92, 64, 94, 110, and 66.

In reverse gear, power flows through elements 61, 71, 100, 80, 63, 83, 110, and 66.

Thus, in the exemplary embodiment of FIGS. 7 to 13, five gearwheels are required in each case on the input shaft 61 and the second countershaft 64, and only four gearwheels on the first countershaft 63. This, together with the gearwheel on the third countershaft 65 and the output gearwheel 110, results in a total gearwheel count of sixteen.

We claim:

1. A motor vehicle transmission having gearings for six forward speeds and one reverse speed, said transmission comprising:

a drive shaft;
   a first countershaft;
   a second countershaft;
   an output shaft;
   a first meshing gearwheel set for a first forward speed, comprising a first non-rotatable gearwheel on said drive shaft and a first freely-rotatable gearwheel on said first countershaft;
   a second meshing gearwheel set for a second forward speed, comprising a second non-rotatable gearwheel on said drive shaft and second freely-rotatable gearwheel on said first countershaft;
   a third meshing gearwheel set for a third forward speed comprising a third non-rotatable gearwheel on said drive shaft and a first freely-rotatable gearwheel on said second countershaft;
   a fourth meshing gearwheel set for a fourth forward speed, comprising a fourth non-rotatable gearwheel on said drive shaft and a second freely-rotatable gearwheel on said second countershaft;
   a fifth meshing gearwheel set for a fifth forward speed, comprising said third non-rotatable gearwheel on said drive shaft and a third freely-rotatable gearwheel on said first countershaft;
   a sixth meshing gearwheel set for a sixth forward speed, comprising said fourth non-rotatable gearwheel on said drive shaft and a fourth freely-rotatable gearwheel on said first countershaft;
   a seventh meshing gearwheel set for a reverse speed, comprising said first non-rotatable gearwheel on said drive shaft and said first freely-rotatable gearwheel on said first countershaft belonging both to said first gearwheel set, and comprising a third further, freely-rotatable gearwheel on said second countershaft, said first freely-rotatable gearwheel from said first gearwheel set meshing with said third freely-rotatable gearwheel of said second countershaft;
   an eighth meshing gearwheel set comprising a non-rotatable gearwheel each on said first countershaft, said second countershaft and said output shaft, respectively, said non-rotatable gearwheel on said output shaft meshing with both non-rotatable gearwheels on said countershafts;
   a first gearshift sleeve on said first countershaft arranged between said first and said second gearwheel sets for selectively engaging said first or said second forward speed, respectively;
   a second gearshift sleeve on said second countershaft arranged between said third and said fourth gearwheel sets for selectively engaging said third or said fourth forward speed, respectively;
   a third gearshift sleeve on said first countershaft arranged between said fifth and said sixth gearwheel sets for selectively engaging said fifth or said sixth forward speed, respectively; and
   a fourth gearshift sleeve on said second countershaft arranged adjacent said seventh gearwheel set for selectively engaging said reverse gear.

2. The transmission of claim 1, wherein said non-rotatable gearwheels on said countershafts have different numbers of teeth.

* * * * *

UNITED STATES PATENT AND TRADEMARK OFFICE
CERTIFICATE OF CORRECTION

PATENT NO. : 5,311,789
DATED : May 17, 1994
INVENTOR(S) : Henzler, Helga, et al

It is certified that error appears in the above-indentified patent and that said Letters Patent is hereby corrected as shown below:

On the title page, Assignee should read —Getrag Getriebe- und Zahnradfabrik Hermann Hagenmeyer GmbH & Cie.—

Signed and Sealed this

Eighteenth Day of April, 1995

Attest:

BRUCE LEHMAN

Attesting Officer

Commissioner of Patents and Trademarks